(12) United States Patent
Jocher et al.

(10) Patent No.: US 6,209,940 B1
(45) Date of Patent: Apr. 3, 2001

(54) SYSTEM FOR THE ASSEMBLY OF LAMINAR COMPONENTS, ESPECIALLY PARTS OF THE EXTERNAL SKIN OF A MOTOR VEHICLE

(75) Inventors: Reiner Jocher, Aidlingen; Frank Michalak, Grafenau; Walter Nuber, Göppingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/347,855

(22) Filed: Jul. 9, 1999

(30) Foreign Application Priority Data

Jul. 9, 1998 (DE) .............................. 198 30 688

(51) Int. Cl.⁷ .................................................. B62D 27/00
(52) U.S. Cl. ......................... 296/29; 296/198; 403/157; 403/338; 280/154; 52/716.6
(58) Field of Search ................ 296/29, 191, 198; 293/155; 403/116, 113, 157, 332.4, 338; 280/154, 155, 849, 851; 52/716.6, 716.5; 16/262, 263; 24/545, 563, 297

(56) References Cited

U.S. PATENT DOCUMENTS

| 445,631 | * | 2/1891 | Smith | 403/157 |
|---|---|---|---|---|
| 532,658 | * | 1/1895 | Gillespie | 403/113 |
| 533,663 | * | 1/1895 | Old | 296/29 X |
| 636,766 | * | 11/1899 | Davis | 296/29 X |
| 741,362 | * | 10/1903 | Ohnstrand | 296/29 X |
| 1,538,426 | * | 5/1925 | Dunston | 293/155 |
| 1,762,580 | * | 6/1930 | Menk | 403/113 |
| 1,869,060 | * | 7/1932 | Harter | 403/113 |
| 3,046,073 | * | 7/1962 | Saussure | 403/113 |
| 3,462,179 | * | 8/1969 | Hinkle | 403/157 |
| 3,680,448 | * | 8/1972 | Ballingall et al. | 403/113 |
| 3,853,344 | * | 12/1974 | Shimoe | 293/155 |
| 4,011,626 | * | 3/1977 | Chandler | 293/155 |
| 4,215,873 | | 8/1980 | Price | 280/153 R |
| 4,727,629 | | 3/1988 | Hoen et al. | 24/458 |
| 4,950,100 | * | 8/1990 | Horgas | 403/113 |
| 4,961,603 | * | 10/1990 | Carpenter | 293/155 |
| 5,048,868 | | 9/1991 | Arenhold | 280/848 |
| 5,509,361 | * | 4/1996 | Chen | 403/113 |
| 5,697,644 | * | 12/1997 | Logan et al. | 296/198 |
| 5,807,007 | * | 9/1998 | Stemper | 403/157 |
| 5,964,253 | * | 10/1999 | Fumex | 403/157 |

FOREIGN PATENT DOCUMENTS

| 2924574 C2 | 1/1980 | (DE) . | |
|---|---|---|---|
| 34 24 290 | 2/1985 | (DE) . | |
| 19543971 A1 | 5/1997 | (DE) . | |
| 0 687 819 | 12/1995 | (EP) . | |
| 26895 | * of 1910 | (GB) | 403/157 |
| 981484 | 2/1962 | (GB) . | |
| 2 274 872 | 8/1994 | (GB) . | |
| 49-3129 | 1/1974 | (JP) . | |
| 54-88478 | 6/1979 | (JP) . | |
| 54-91556 | 6/1979 | (JP) . | |
| 0748064 | * 7/1980 | (SU) | 403/157 |

* cited by examiner

Primary Examiner—Dennis H. Pedder
Assistant Examiner—Hilary Gutman
(74) Attorney, Agent, or Firm—Evenson, McKeown, Edwards & Lenahan, P.L.L.C.

(57) ABSTRACT

A system is provided for assembling laminar components in places with different access. The laminar components are provided with parallel projecting flanges and a clip for bringing these flanges together. The clip is configured as a channel which is provided at one end with a pin running between the flanges of the channel. The clip is inserted into an opening in the flange and serves as a pivot point for swinging the channel to the end position.

10 Claims, 2 Drawing Sheets

SYSTEM FOR THE ASSEMBLY OF LAMINAR COMPONENTS, ESPECIALLY PARTS OF THE EXTERNAL SKIN OF A MOTOR VEHICLE

BACKGROUND OF THE INVENTION

This application claims the priority of German Application No. 198 30 668.7-12, filed Jul. 9, 1998, the disclosure of which is expressly incorporated by reference herein.

The present invention relates to a system for the assembly of laminar components, especially parts of the external skin of a motor vehicle, which are provided with parallel projecting flanges which are held to one another by at least one channel-shaped cross section.

Parts of the external skin in motor vehicle construction, such as mudguard parts and bumpers, are generally joined together by screws or speed nuts or, if they are made of plastic, by appropriate fasteners. These fastening processes require as a rule several working steps and corresponding tools in order to bring the fasteners to the planned position. It is also known to provide laminar components with bent-away flanges at their joining edges and hold these flanges in alignment parallel to one another with channel-shaped pieces. This is not permanent enough under certain circumstances unless a form-fitting junction is made, and it is also expensive. All these types of fastening cannot, however, be used any longer or only with great difficulty if the joints are situated such that they are difficult to reach from the outside.

SUMMARY OF THE INVENTION

An object of the present invention is to configure an assembly system in which simple and secure assembly becomes possible, even when the joints are difficult to reach.

This object has been achieved by providing a system in which the clip is in the form of a channel which is provided at one end with a pin running between the flanges of the channel. Each flange is provided with a slot running in alignment with one in the other flange, and the pin is inserted into this slot to serve as a fulcrum for closing the channels and fastening them together.

With the configuration according to the present invention, an important simplification of assembly is achieved because, after the pin is inserted into the corresponding slot, only a relatively simple swinging movement is possible. Over the entire length of the channel a uniform drawing together of the flanges projecting from the laminar components can be achieved. At the same time, however, by the insertion of the pin at one point a fit between the parts is achieved, which can be completed when the channel, in a further embodiment of the invention, is provided near its end remote from the pin with an opening to accommodate a securing element which can be inserted into corresponding openings in the flanges.

A yet further embodiment of the invention is provided for components whose flanges are accessible from only one end, as may be the case at the junction between the mudguard and the front bumper, if a complete front module is present, and also the assemblies are already installed in the front area. It can be very advantageous if the slot runs at an angle other than 90° from the outer edges of the flange. The pin can then be inserted at an angle to the flange edges, which is possible with the elongated channel even in cramped assembly conditions. Then, all that is necessary is to swing the channel closed, because the channel is already held in the correct position in the slot.

In a still further embodiment, the slot can be inclined from the outer edges of the flange rearwardly at an angle away from the accessible end of the flange. The slot can be arranged so that the lateral edge of the opening remote from the accessible end of at least one flange will form the lead-in projection extending out past the abutment surface formed by the outer edges of the flange ahead of the opening. In this embodiment, the channel with the pin can be shifted in contact with the outer edges along the flange until the lead-in projection is reached. Thereafter, by additional application of force in the direction of the shift, the pin passes at an angle to its end position in the slot, so that then the swinging operation for clipping the channel can begin. This still further embodiment therefore makes it possible even in very little available space to perform the necessary installation for the assembly of the two laminar parts.

In another contemplated embodiment of the invention, the flanges of the channel can form, at the end on which the pin is provided, a fork straddling the flanges, in the area of which the web of the channel is removed. This embodiment permits a simple and trouble-free displacement of the pin along the outer edges of the flange up to the opening and its insertion therein until it abuts in the opening.

The channel can finally, in a further embodiment of the invention, be provided with reinforcing beads to apply sufficient gripping force. The beads are placed as near as possible to the free edges of the flanges in order to keep the flanges as close together as possible in the area of the laminar components being joined. The free edges of the channel can be flexed upward from the beads opposite one another to form an introduction ramp. The channels can be made out of metal and the components with the flanges out of plastic. Thereby, this material combination achieves a stable junction and fastening.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
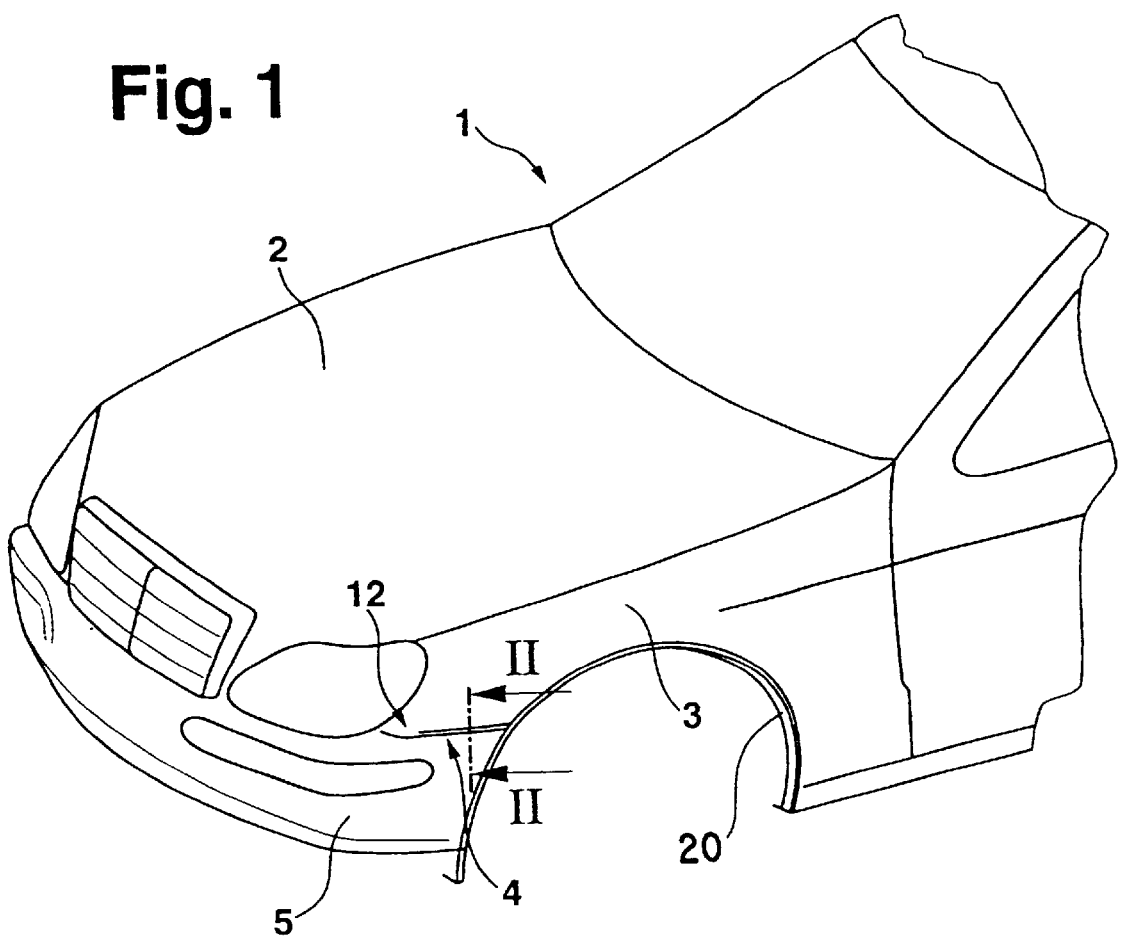
FIG. 1 is a schematic perspective view of the front end of a passenger automobile in which the front mudguard is joined to the bumper by a system according to the present invention.
Figure 2:
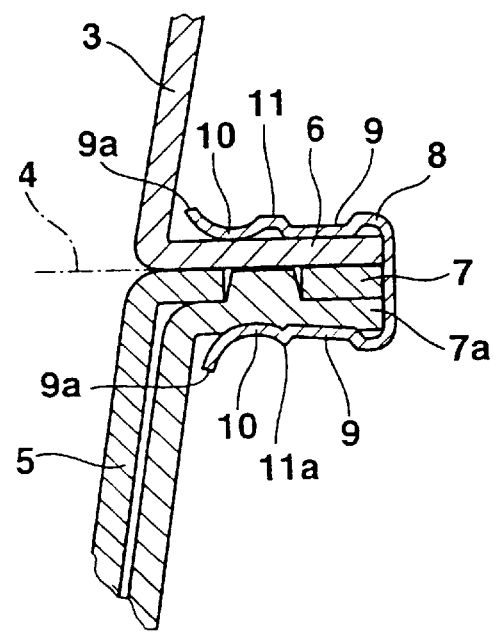
FIG. 2 is an enlarged cross-sectional view taken along line II—II in FIG. 1.

FIG. 1 shows that, in the area of the front end of a passenger car 1, the hood 2 is placed between lateral mudguards 3, which in turn are to be tightly joined to the front bumper 5 in the plane of separation 4. The two laminar components, i.e., on one hand the mudguard 3 and, on the other hand, the area of the bumper 5 to be joined thereto are, as FIG. 2 shows, provided with bent-away flanges 6 and 7. The flange 7 is double-walled and consists of a second flange portion 7a which reaches in a partially form-fitting manner into the flange 7. The two flanges 6, 7 are aligned parallel with one another and lie in contact with one another in the separation plane 4. They are clamped tightly together by a channel 8 which is pushed onto the flanges 6 and 7, as it will be discussed below, and which is provided in the area of the free ends of its own flanges 9 with inwardly reaching beads 10 which extend from outwardly raised beads 11, 11a. The beads 10 produce good contact of the channel 8 in the area of the flanges 6, 7 which border the respective laminar components 3, 5. To facilitate the placement of the channel 8 onto the flanges 6, 7, the free ends 9a of the flanges 9 of channel 8 are turned up in opposite directions so as to form a kind of insertion ramp for the channel 8.

Figure 3:
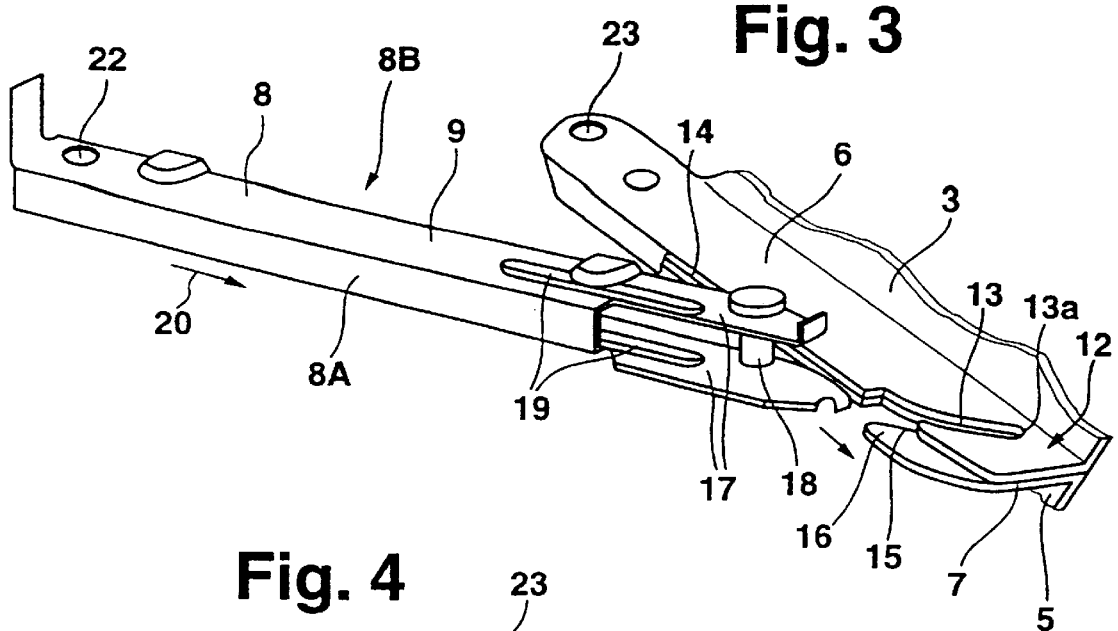
FIG. 3 is a perspective view of the seam area of FIG. 2 during the attachment of the channel serving to join the parts together at the flanges of the parts to be joined.
Figure 4:
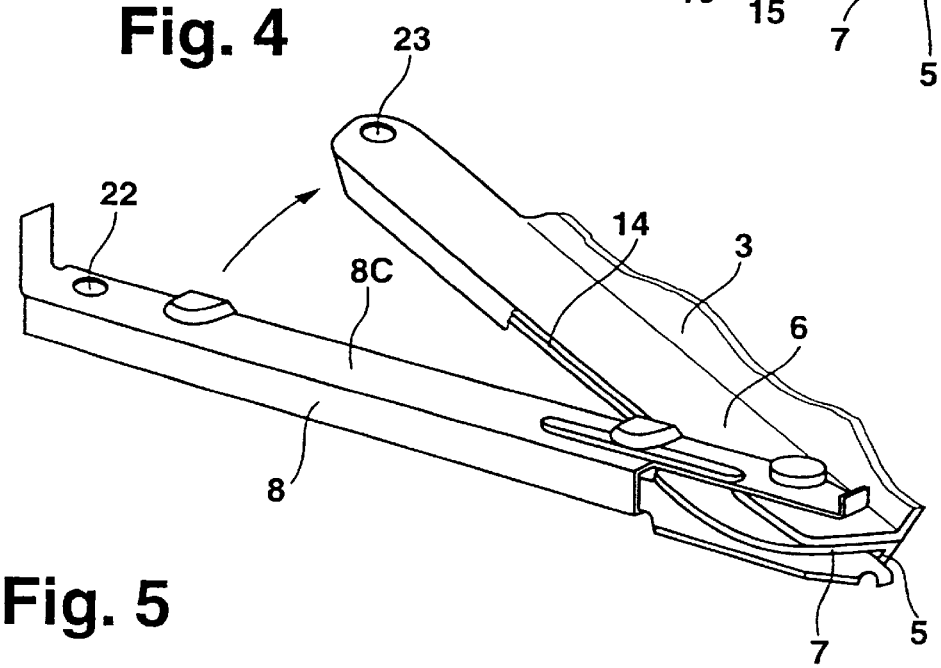
FIG. 4 is a view similar to FIG. 3, but in the position wherein the channel serving for clamping is to be swung with one end to fit between the flanges and then is to be swung.
Figure 5:
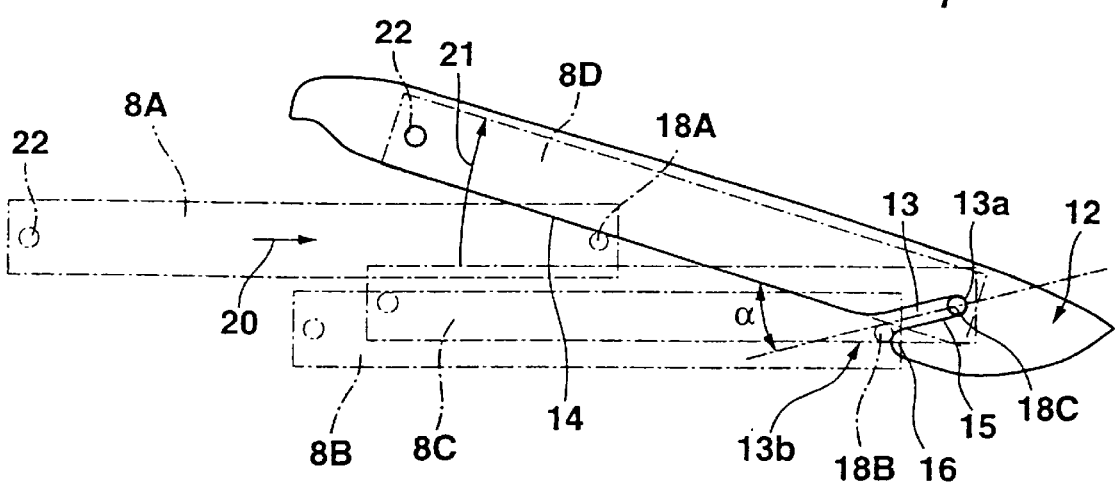
FIG. 5 is a plan view of the assembly procedures shown in FIGS. 3 and 4 as well as the end position of the channel serving as a channel in the position shown in FIG. 2.

FIGS. 3 to 5, which show portions of the area of the flanges 6, 7 in contact with one another, with the channel 8 which is to be attached, show that the flanges 6, 7 are provided in their front end portion 12 situated at the front end of the vehicle with a common slot 13 which runs at an angle α to the outer edges 14 of the flanges 6, 7. Thereby, the end 13a of the opening is closer to the front end 12 of the flanges 6, 7 than the insertion opening 13b as seen in FIG. 5.

The lateral edge 15 of the lower flange 7, which faces the front end 12, as seen in FIGS. 2 and 5, reaches or extends beyond the plane formed by the outside edges 14 of flanges 6, 7, so that a lead-in projection 16 is formed at the entry opening 13b of the slot 13, ahead of the opening.

FIGS. 3 and 4 most clearly show that the channel 8 forms at its right end a forked section 17 because the web 8A joining the flanges 9 of the channel 8 is removed in this area. A pin 18 is inserted between the two parts forming the forked section. The pin diameter is slightly less than the width of the slot 13. The channel 8 is provided in the area of the beginning of the forked section 17 with stiffening beads 19 and its flanges are furthermore shaped in the manner shown in FIG. 2.

The area of the plane of separation 4 of FIG. 1 is accessible only with great difficulty for the purpose of assembling the mudguard and bumper 5 because, at the time when these parts are to be joined together, all of the other units are already in the front end of the vehicle. It is now possible with the present invention from the recess or cutout 20 defined by the stiffening bead 1 for the wheels to place the channel 8 in the manner shown in FIG. 3 against the outer edges 14 of the flanges 6, 7 with their pin 18 and then slide it along these outside edges. This first position, which is the position shown in FIG. 3, is identified schematically by 18A in FIG. 5. It can be seen that here the pin 18 in its position 18A is in contact with the outer edges 14 of the two flanges and can be pushed along in the direction shown by the arrow relative to the front end 12 along these outside edges 14.

Numeral 8B in FIG. 5 identifies the position in which the pin has reached its position 18B in front of the slot 13 and has come in contact with the projection 16. If now a force is applied in the direction of the arrow 20 to the channel 8 in position 8B, the pin 18 snaps into the slot 13 and reaches its end position 18C. The channel 8 is then swung out of position 8C in the sense of the arrow 21 until it reaches its end position 8D in which the two flanges 6, 7 are clamped tightly against one another as shown in FIG. 2. In this end position a lock, e.g. an additional pin, can be inserted through an opening 22 at the end remote from the pin 18 in order to secure the end position. With the channel 8 in position 8D, this lock then passes through the opening 22 and corresponding openings 23 in flanges 6, 7.

As clearly illustrated, an interlock is thus produced between the channel 8 and the flanges 6, 7 by the pin 18 in the slot 13, on one hand, and by the securing pin passed through the opening 22. On the other hand, a frictional connection holds the two flanges 6, 7 together in the separation plane 4. The channel 8 can therefore be made of metal and components 6, 7 of plastic. But other materials are also contemplated. The fastening concept described works both in the material combinations of metal-and-plastic and metal-and-metal. And it is also contemplated that the channel 8 can be made of plastic.

Finally, FIG. 5 makes it evident that an easy assembly is possible, even in very limited space conditions, where the flanges are accessible only from one side, i.e. from the recess 20 for the wheels as in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for assembly of laminar components provided with parallel projecting flanges, comprising at least one U-shaped clamp configured as a channel with profile flanges, which channel is provided at one end thereof with a pin running between the profile flanges to hold the projecting flanges wherein the pin is arranged to be insertable into a slot on the projecting flanges and to serve as a pivot point for swinging and locking of the channel on the projecting flanges wherein a lateral edge of the slot of at least one of the projecting flanges forms a lead in projection forward of the slot and extends out beyond an abutment surface formed by outside edges of the projecting flanges.

2. The system according to claim 1, wherein the channel is provided in an area of an end thereof remote from the pin with an opening for insertion of a securing device configured to be introduced into a corresponding opening in the projecting flanges.

3. The system according to claim 1, wherein the laminar components have the projecting flanges which are accessible from only one longitudinal direction, and the slot is at an angle other than 90° C. from the outside edges of the projecting flanges.

4. The system according to claim 3, wherein the slot is inclined at an angle to the outside edges of the projecting flanges running into the projecting flanges in a direction away from a longitudinally accessible end.

5. The system according to claim 1, wherein the profile flanges of the channel form, at an end thereof having the pin, a fork straddling the projecting flanges.

6. The system according to claim 1, wherein the channel includes inwardly reaching beads for applying sufficient clamping force.

7. The system according to claim 6, wherein the inwardly reaching beads are arranged close to free ends of the profile flanges.

8. The system according to claim 7, wherein the free ends of the profile flanges of the channel are bent upwardly from the inwardly reaching beads away from one another to form a lead-in ramp.

9. The system according to claim 1, wherein the channel is metal and the components and the projecting flanges are plastic.

10. The system according to claim 5, wherein the profile flanges include stiffening beads in an area of the fork.

* * * * *